(No Model.)

J. FREEMAN, Dec'd.
C. R. FREEMAN, Administratrix.
GALVANIC BATTERY.

No. 374,669. Patented Dec. 13, 1887.

Witnesses:
Inventor:
Joseph Freeman
by Catherine R. Freeman
Administratrix
by Atty.

UNITED STATES PATENT OFFICE.

CATHERINE R. FREEMAN, OF HARTFORD, CONNECTICUT, (ADMINISTRATRIX OF JOSEPH FREEMAN, DECEASED,) ASSIGNOR OF ONE-HALF TO DAVID HENNEY, OF SAME PLACE.

GALVANIC BATTERY.

SPECIFICATION forming part of Letters Patent No. 374,669, dated December 13, 1887.

Application filed June 22, 1887. Serial No. 242,173. (No model.)

*To all whom it may concern:*

Be it known that JOSEPH FREEMAN, (deceased,) late of the city of Hartford, in the county of Hartford and State of Connecticut, invented certain new and useful Improvements in Batteries for Electrical Purposes, of which the following is a specification.

The main object of the invention is to construct a battery of high electro-motive force, small internal resistance, and great constancy. A secondary object is to secure compactness of construction and ease of manipulation.

The apparatus in which the inventor embodied his invention consists, essentially, of a carbon plate suitably supported within a jar, a porous cell supported above the carbon plate, and a zinc plate within the said porous cell, the plate being either amalgamated or immersed in mercury. Means are provided for introducing fresh exciting-fluid from the external jar to the upper part of the porous cell, and also suitable means for removing the spent exciting-fluid from the bottom of the porous cell.

The apparatus is illustrated in the accompanying drawings, in which—

Figure 1:
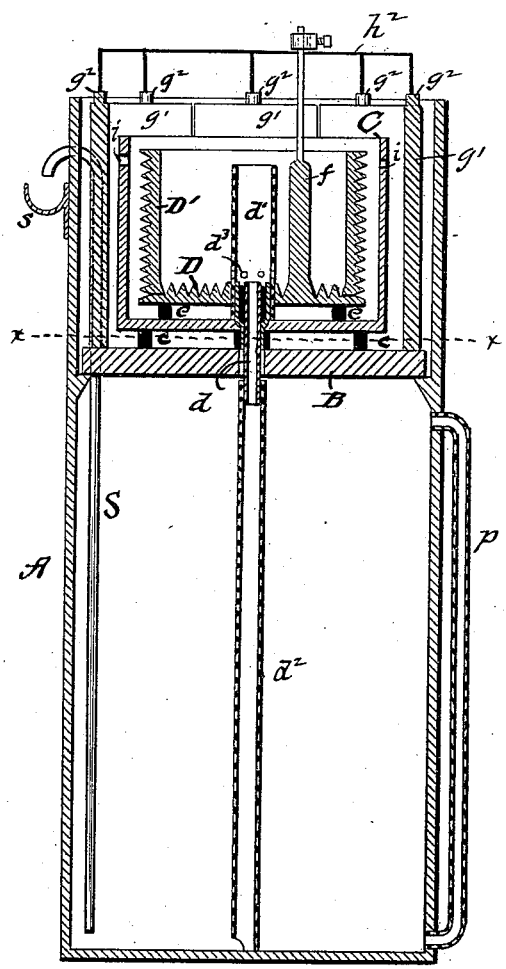
Figure 2:
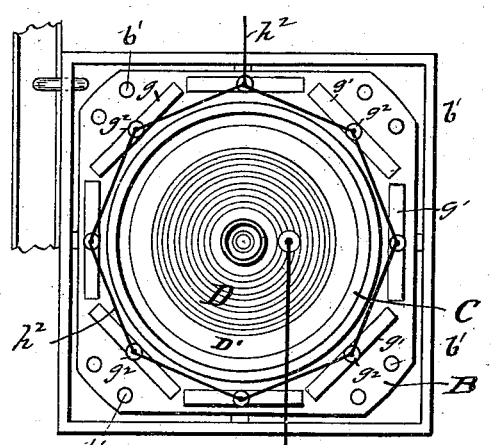
Figure 3:
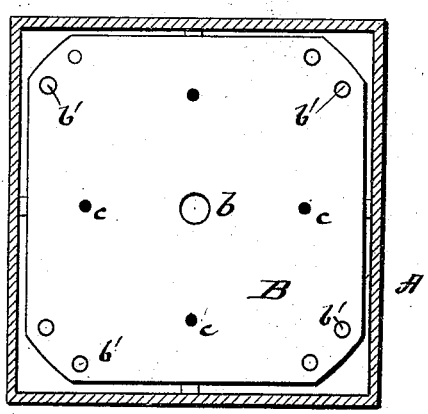
Figure 4:
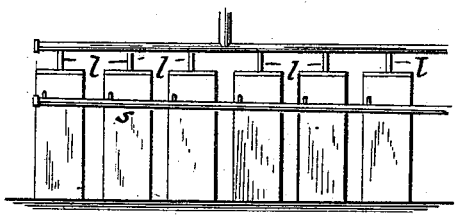

Figure 1 is a vertical transverse section of one form of battery constructed according to the inventor's improvements. Fig. 2 is a plan of the same. Fig. 3 is a horizontal section on line $xx$ in Fig. 1; and Fig. 4 shows several battery-cells combined, illustrating the feeding devices.

A is a battery-jar, which is formed of glass or any other suitable material and is provided with internal ledges or projections, upon which rests the carbon plate B. The latter is provided with a central aperture, $b$, and has attached to it blocks $c$, of insulating material, which project a short distance above its upper surface. The blocks $c$ support a porous cell, C, which is preferably made of large diameter. A disk or plate, D, of zinc, is supported a short distance above the bottom of the porous cell by studs $e$, projecting from the under side of the said disk or plate. The disk is ribbed or corrugated upon its upper surface, and is beveled at its outer edge, so as to be fitted by a ring, D', of zinc, having a beveled inner edge at the bottom. The ring is corrugated upon its outer surface.

Within the aperture $b$ in the carbon plate, and corresponding apertures in the porous cell C and the plate or disk D, a tube, $d$, of hard rubber or other non-conducting acid-proof material, is inserted. The tube is joined below the carbon plate to a tube, $d^2$, which passes downward to a point near the bottom of the jar A. It is also joined near the top to a tube, $d'$, which extends upward into the cell formed by the disk D and the ring D'. The tube $d'$ is perforated at $d^3\ d^3$, to admit of the free passage of the exciting-fluid through the same.

External connection is made with the zinc-pole of the cell through a conductor, $f$, which is formed on the upper side of the zinc plate D and extends upward above the top of the porous cell C, where it is provided with a suitable binding-screw. The conductor is protected by an insulating acid-proof covering where it passes through the liquid. The mode of connecting an external conductor to the carbon plate B is illustrated in Figs. 1 and 2. On the said plate are formed posts $g'\ g'$, from which project binding-studs $g^2\ g^2$, as shown. The posts are arranged in a circle around the plate or disk D, and are all connected with a common external conductor, $h^2$.

The jar A is filled with the ordinary bichromate solution, or with any suitable exciting-fluid, to a point near the top of the ring D'. The solution is taken from a suitable reservoir and is conducted through a series of tubing such as is illustrated in Fig. 4. When the solution by constant use increases in specific gravity, the heavy part of it passes down through the tubes $d'$, $d$, and $d^2$ to the bottom of the jar A, being replaced by the unused solution from the jar A, which passes through holes $i\ i$ into the porous cell. In this manner the renewal of the solution in the porous cell is maintained until the fluid is practically exhausted.

The tube $p$ (shown at the right of Fig. 1) is a glass tube for showing the color of the solution at any time. S represents a siphon-tube, the outer extremity of which stands over a trough, $s$, for carrying off the spent liquid.

The mouth of the siphon is placed somewhat lower than the top of the solution, so that the spent liquid will be forced out by gravity whenever fresh liquid is admitted from the reservoir.

The liquid from the reservoir flows through the pipes $l$ and into each jar A at the top. Thence it passes through holes $b'b'$ in the carbon plate until the liquid rises to the level of that plate, and upon a still further rise it passes slowly through the openings $i\,i$ into the porous cell.

The tubes $d$, $d'$, and $d^2$ may all be made as a single tube, instead of being constructed in three parts, as shown in the drawings.

The object of the corrugations upon the plate D and the ring D' is to furnish as much surface of zinc as possible, and thereby increase the effects of the action of the exciting-fluid.

It is evident that with the arrangement of apparatus invented by the aforesaid Joseph Freeman a free circulation of the exciting fluid is caused continually. On this account the whole strength of the solution is applied in the most effective manner and a battery of great constancy and high electro-motive force is secured.

Having thus described the invention of JOSEPH FREEMAN, what I claim as new, and desire to secure by Letters Patent, is—

1. In a battery, the combination of a jar or vessel, a carbon plate supported in a horizontal position within the same, a porous cell supported above the carbon plate, a zinc plate located within the porous cell, and means for introducing fresh exciting-fluid to the upper part of the porous cell and removing the spent solution from the lower part thereof, substantially as described.

2. In a battery, the carbon plate B, supported in the jar A, the porous cell C, supported by the carbon plate and having an aperture for receiving the discharge-tube $d$ for the spent solution, and the discharge-tube $d$, entering the said aperture and reaching downward toward the bottom of the jar, the said porous cell being provided near the top with apertures $i\,i$, for the admission of fresh solution, as and for the purpose set forth.

3. In a battery, the combination of a jar having internal ledges or projections for supporting the battery elements, a carbon plate resting on the said projections, a porous cell having apertures near the top for the passage of the exciting-fluid, and being provided with a discharge-tube in the bottom for the escape of the spent solution, a ring of zinc located within the porous cell, and binding posts or screws connected with the zinc and carbon plates, substantially as set forth.

4. In a galvanic battery, a carbon plate provided with a series of posts and a series of binding-screws or posts formed thereon, as and for the purpose set forth.

5. A battery-cell in which one of the elements is perforated and supported horizontally at a considerable distance above the bottom of the containing-jar, while the other is located within a porous cell supported on the first-named element, the two elements and porous cell being traversed by a tube which opens into the lower part of the battery-jar, whereby an exit is formed for the spent fluid within the jar and the fresh fluid is brought into contact with the elements, as and for the purpose set forth.

In testimony whereof I hereunto set my hand in the presence of two subscribing witnesses.

CATHERINE R. FREEMAN,
*Administratrix.*

Witnesses:
WILLIAM F. HENNEY,
AUSTIN BRAINARD.